May 18, 1926.
C. LATTA
1,584,873
PISTON SEALING RING
Filed Feb. 5, 1925
Fig. 1.
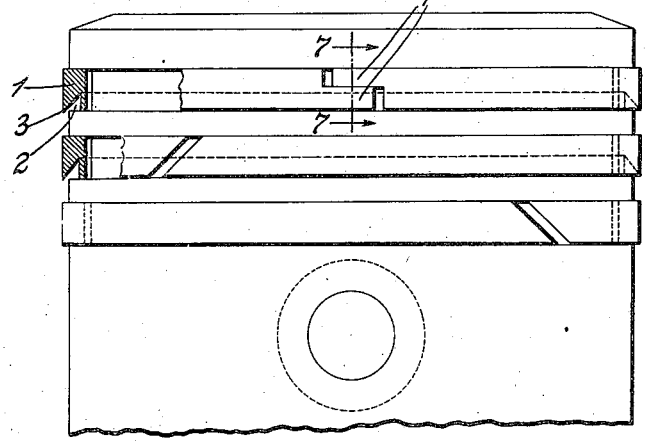
Fig. 2.    Fig. 3.    Fig. 4.
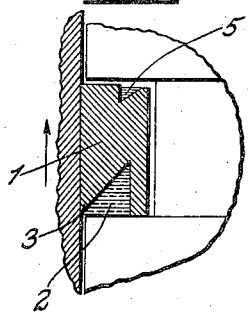 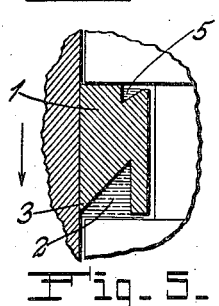 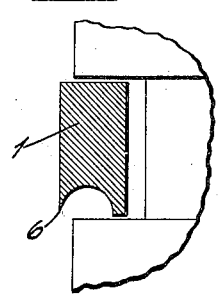
Fig. 5.
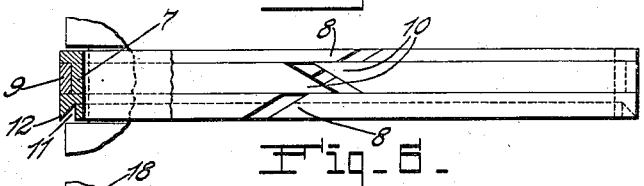
Fig. 6.
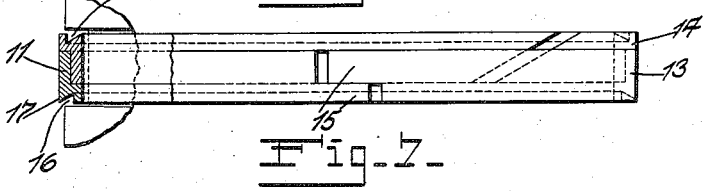
Fig. 7.
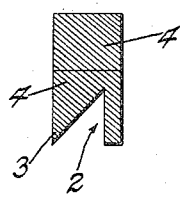
Inventor.
Charles Latta,
by Rippey Kingsland
His Attorneys.

Patented May 18, 1926.

1,584,873

UNITED STATES PATENT OFFICE.

CHARLES LATTA, OF ST. LOUIS, MISSOURI.

PISTON-SEALING RING.

Application filed February 5, 1925. Serial No. 6,971.

This invention relates to piston sealing rings.

An object of the invention is to provide an improved sealing ring for pistons comprising a resilient ring provided with a groove in one side edge, the wall of said groove that is nearer the inner periphery of the ring being on a shorter radius of the piston for which the ring is intended so that when the ring is placed upon the piston said groove forms an annular chamber, two walls of which are in the ring and one wall of which is formed by the wall of the piston groove in which the ring is mounted.

Another object of the invention is to provide a sealing ring for pistons having a groove in the lower end or side edge thereof, bounded on its outer side by a wall terminating in a sharp corner at the periphery of the ring and operating as a scraping edge to scrape oil from the cylinder walls into the groove during the forward stroke of the piston; and bounded on its opposite side by a wall formed on a shorter radius than the radius of the piston for which the ring is intended so that when the ring is mounted on the piston said groove forms an annular chamber, the lower wall of which is formed by the wall of the piston groove.

Another object of the invention is to provide a piston sealing device comprising a resilient ring composed of one or more parts as desired and having oil retaining grooves in its upper and lower edges.

Another object of the invention is to provide an improved sealing device for pistons comprising a ring having a joint constructed to form a peripheral plane surface to contact with the cylinder walls throughout the circumference of the ring and across the ends thereof to close communication between the forward and rear sides of the ring across the ends thereof, said ring having a groove in one side edge of radial width so that the inner wall of the groove is on a shorter radius than the radius of the piston whereby the adjacent wall of the piston groove will support oil within said ring groove.

Another object of the invention is to provide a split sealing ring for pistons having a groove in its lower side edge, in combination with means at the ends of the ring substantially preventing the passage of oil from said groove through the ring joint.

Other objects will appear from the following description, reference being made to the accompanying drawing in which—

Fig. 1 is a view showing my improved sealing ring applied to a piston, parts of the ring being in section.

Fig. 2 is an enlarged sectional view of the ring including a groove in the upper edge thereof in addition to the essential groove in the lower edge thereof, showing the position of the ring on the upward stroke of the piston.

Fig. 3 is a view similar to Fig. 2, showing the position of the ring on downward stroke of the piston.

Fig. 4 is a sectional view showing a variation in the form of the groove.

Fig. 5 is a view partly in section showing the invention in a ring in which a peripheral plane surface is formed across the ring joint by an additional ring.

Fig. 6 shows the invention embodied in a different form of ring.

Fig. 7 is a cross sectional view of the ring on the line 7—7 of Fig. 1.

One form of the invention comprises a resilient split ring 1 having an annular groove 2 in the lower side edge thereof essentially of a radial width so great that when the ring is placed in the piston groove a chamber is formed one wall of which consists of the adjacent wall of the piston groove. As clearly shown in Fig. 1 the outer wall of said groove terminates in a sharp corner 3 at the periphery of the ring beyond the plane of the periphery of the piston; while the inner wall of said groove is on a shorter radius than the radius of the piston so that the lower wall of the piston groove forms the lower wall of the groove chamber. Said chamber has an oil receiving opening between the adjacent edge of the piston and the corner 3 through which the oil scraped by the corner 3 from the cylinder wall during the forward stroke of the piston enters said chamber and is retained therein, forming a seal which prevents passage of air into the cylinder during the operation of the piston.

The upper ring 1 shown in Fig. 1 is of the step cut type having its ends 4 in lateral contact substantially preventing the passage of oil and air through the joint. The ends 4 also form a peripheral plane surface in continuation of the remaining portion of the ring to contact with the cylinder walls between the forward and rear sides of the ring. As clearly shown in Fig. 6 the groove 2 is of less vertical depth than the vertical width of the ends 4 through which it extends so that there is no communication from said groove through the joint to the upper side of the ring. During upward stroke of the piston the ring 1 seats upon the lower wall of the piston groove, thereby forming an annular chamber the lower wall of which comprises the lower wall of the piston groove as clearly shown in Fig. 2.

An additional groove 5 may be formed in the upper side edge of the ring, as clearly shown in Fig. 2. As there shown the entire groove 5 is wholly within the piston groove and the wall of the groove 5 that is toward the outer periphery of the ring does not incline toward the outer periphery of the ring but forms an abrupt wall or embankment preventing the oil from passing therefrom outwardly. During downward stroke of the piston the ring 1 seats against the upper wall of the piston groove thus keeping the ring 5 entirely filled with oil as clearly shown in Fig. 3.

The groove shown in Fig. 4 has a curved wall which, however, forms a sharp corner 6 at the periphery of the ring to scrape oil into the oil chamber comprising said groove.

The sealing ring shown in Fig. 5 is in two parts comprising a part 7 of the open resilient type, the ends of which are cut to form oblique overlapping portions 8. The part 8 is formed with a circumferential groove in which an outer member 9 is mounted. The peripheries of the parts 7 and 9 are in the same annular plane and are arranged to work and operate against the interior surface of the cyinder to prevent the passage of air or gas between the piston and the cylinder. The part 9 is also of the open resilient type and its ends are cut to form oblique overlapping portions 10 at opposite angles of inclination from the angles of inclination of the oblique overlapping portions 8, so that the gap at the ends of the ring is always closed and there is always presented a peripheral plane surface to contact with the cylinder walls between the forward and rear sides of the ring across the gap to close communication between the forward and rear sides at the periphery of the ring.

A groove 11 is formed in the lower edge of this ring, one wall of which groove forms a sharp scraping edge 12 at the periphery of the ring to scrape oil into the groove 11 which forms an oil retaining chamber the lower wall of which is the lower wall of the piston groove.

The invention may be embodied in various types of rings, an additional one of which is shown in Fig. 6. As there shown the ring comprises two members of which the member 13 encircles a part of the member 14, the combined width of the peripheral portions of said two members forming the peripheral surface of the packing ring. One of said members may be provided with a step cut joint having its ends 15 contacting laterally to prevent the passage of oil through the joint. A groove 16, similar to the grooves 2 and 11, is formed in the lower edge of the member 13 one wall of said groove forming a sharp scraping edge 17 at the periphery of the ring. The groove 16 forms an oil retaining chamber for the oil scraped from the cylinder walls by the edge 17 during the forward stroke of the piston. If desired, the upper edge of the member 14 may be provided with an oil retaining groove 18 similar to the oil retaining groove 5.

A piston sealing ring of this construction possesses many advantages in that the trapped oil retained within the oil groove chambers forms an efficient seal to prevent the passage of air during operation of the piston. The device is highly efficient and may be varied in other particulars than those herein specifically mentioned without departure from the nature and principle of the invention.

I do not restrict myself unessentially but what I claim and desire to secure by Letters Patent is:—

1. A sealing ring for maintaining an oil seal in a ring groove of a piston, comprising a resilient ring provided with an oil groove in its lower side edge having an imperforate inner wall parallel with the axis of the ring and an outer wall inclining toward and intersecting the periphery of the ring forming a sharp corner operating as an edge to scrape the oil from the cylinder wall into said grooves during downward stroke of the piston, and having the other wall intersecting the side edge of the ring closer to the inner periphery than to the outer periphery of the ring.

2. A sealing ring for maintaining an oil seal in a ring groove of a piston, comprising a resilient ring provided with an oil groove in its lower side edge having an imperforate inner wall parallel with the axis of the ring and an outer wall inclining toward and intersecting the periphery of the ring forming a sharp corner operating as an edge to scrape the oil from the cylinder wall into said grooves during downward stroke of the piston, and having the other wall intersecting the side edge of the ring closer to the inner periphery than to the outer periphery of the ring, whereby when said ring is located in a piston groove and in a cylinder an annular chamber is provided by said groove in the lower side edge of said ring having a relatively narrow annular opening between said sharp corner and the adjacent peripheral portion of the piston.

3. A sealing ring for maintaining an oil seal in the ring groove of a piston, comprising a ring having ends and having an oil retaining groove in each of its upper and lower edges and extending from end to end of the ring, the outer wall of one of said grooves being closer to the outer periphery of the ring than the outer wall of the other groove.

4. A sealing ring for maintaining an oil seal in the ring groove of a piston, comprising a ring having ends and having an oil retaining groove in each of its upper and lower edges and extending from end to end of the ring, the outer wall of one of said grooves being closer to the outer periphery of the ring than the outer wall of the other groove, said first named outer wall inclining toward and intersecting the periphery of the ring and said second named outer wall intersecting the side edge of the ring inwardly from the outer periphery of the ring.

CHARLES LATTA.